(12) United States Patent
Tamai

(10) Patent No.: US 10,250,814 B2
(45) Date of Patent: Apr. 2, 2019

(54) IMAGE SIGNAL PROCESSOR APPARATUS AND IMAGE SIGNAL PROCESSING METHOD

(71) Applicant: Kabushiki Kaisha Toshiba, Minato-ku, Tokyo (JP)

(72) Inventor: Takanori Tamai, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 63 days.

(21) Appl. No.: 15/255,898

(22) Filed: Sep. 2, 2016

(65) Prior Publication Data
US 2017/0257548 A1    Sep. 7, 2017

Related U.S. Application Data

(60) Provisional application No. 62/304,429, filed on Mar. 7, 2016.

(51) Int. Cl.
| | |
|---|---|
| *H04N 5/235* | (2006.01) |
| *H04N 13/133* | (2018.01) |
| *H04N 13/239* | (2018.01) |
| *H04N 13/296* | (2018.01) |
| *H04N 9/73* | (2006.01) |
| *H04N 9/04* | (2006.01) |
| *G06T 7/00* | (2017.01) |
| *G06T 7/80* | (2017.01) |

(52) U.S. Cl.
CPC ............ *H04N 5/2352* (2013.01); *G06T 7/85* (2017.01); *H04N 9/735* (2013.01); *H04N 13/296* (2018.05); *H04N 9/045* (2013.01)

(58) Field of Classification Search
CPC .. H04N 5/2352; H04N 13/133; H04N 13/239; H04N 13/25; H04N 13/296; H04N 9/735; H04N 9/73; H04N 9/045; G06T 7/85
USPC ..... 348/222.1, 223.1, 221.1, 362, 229.1, 42, 348/43, 47, 51, 211.3, 655; 382/167, 382/269, 274
See application file for complete search history.

(56) References Cited

U.S. PATENT DOCUMENTS

| | | | |
|---|---|---|---|
| 6,493,467 B1 | 12/2002 | Okuda et al. | |
| 6,862,035 B2 | 3/2005 | Jeong et al. | |
| 6,977,685 B1 * | 12/2005 | Acosta-Serafini | ..... H03N 5/335 |
| | | | 348/308 |
| 8,154,610 B2 | 4/2012 | Jo et al. | |
| 2011/0109727 A1 * | 5/2011 | Matsura | ................. H04N 13/02 |
| | | | 348/47 |
| 2011/0292227 A1 * | 12/2011 | Nakazawa | ............. G03B 35/10 |
| | | | 348/218.1 |
| 2016/0182874 A1 * | 6/2016 | Richards | ................ H04N 9/735 |
| | | | 348/187 |

(Continued)

*Primary Examiner* — Marly S Camargo
(74) *Attorney, Agent, or Firm* — White & Case LLP

(57) ABSTRACT

An image signal processor apparatus according to an embodiment is provided with a first image signal processor apparatus configured to receive first image data as input and a second image signal processor apparatus configured to receive second image data as input, in which the second image signal processor apparatus, using a first signal that the first image signal processor apparatus uses for first image processing to adjust pixel values of the first image data, performs the first image processing to adjust pixel values of the second image data.

18 Claims, 6 Drawing Sheets

(56) References Cited

U.S. PATENT DOCUMENTS

2017/0094141 A1* 3/2017 Hicks ................... H04N 5/2258
348/164
2017/0310903 A1* 10/2017 Lee ........................ H04N 5/247
348/239

* cited by examiner

IMAGE SIGNAL PROCESSOR APPARATUS AND IMAGE SIGNAL PROCESSING METHOD

CROSS-REFERENCE TO RELATED APPLICATIONS

This application is based upon and claims the benefit of priority from U.S. Provisional Application No. 62/304,429, filed on Mar. 7, 2016, the entire contents of which are incorporated herein by reference.

FIELD

Embodiments described herein relate generally to an image signal processor apparatus and an image signal processing method.

BACKGROUND

Conventionally, electronic apparatuses handling image information such as digital cameras perform image processing such as control of white balance and tone mapping control on raw data (RAW data) outputted from a CCD/CMOS image sensor and generate optimum images. Such image processing is carried out in a circuit called an "ISP (image signal processor)." The ISP controls image processing based on statistical information or the like of data outputted from a connected image sensor.

Generally, when images of the same object are picked up by two or more image sensors of a stereo camera or the like, an ISP is provided for each image sensor. The respective ISPs perform exposure control on the image sensors and the above-described image processing.

However, when there are differences in brightness of image pickup regions in the respective image sensors, image processing may be performed using different control parameters among the respective ISPs. In such a case, there is a problem that although images of the same object are picked up, large differences are produced in brightness and colors among images after the ISP processing.

DETAILED DESCRIPTION

Hereinafter, embodiments of the present invention will be described with reference to the accompanying drawings.
(First Embodiment)

Figure 1:
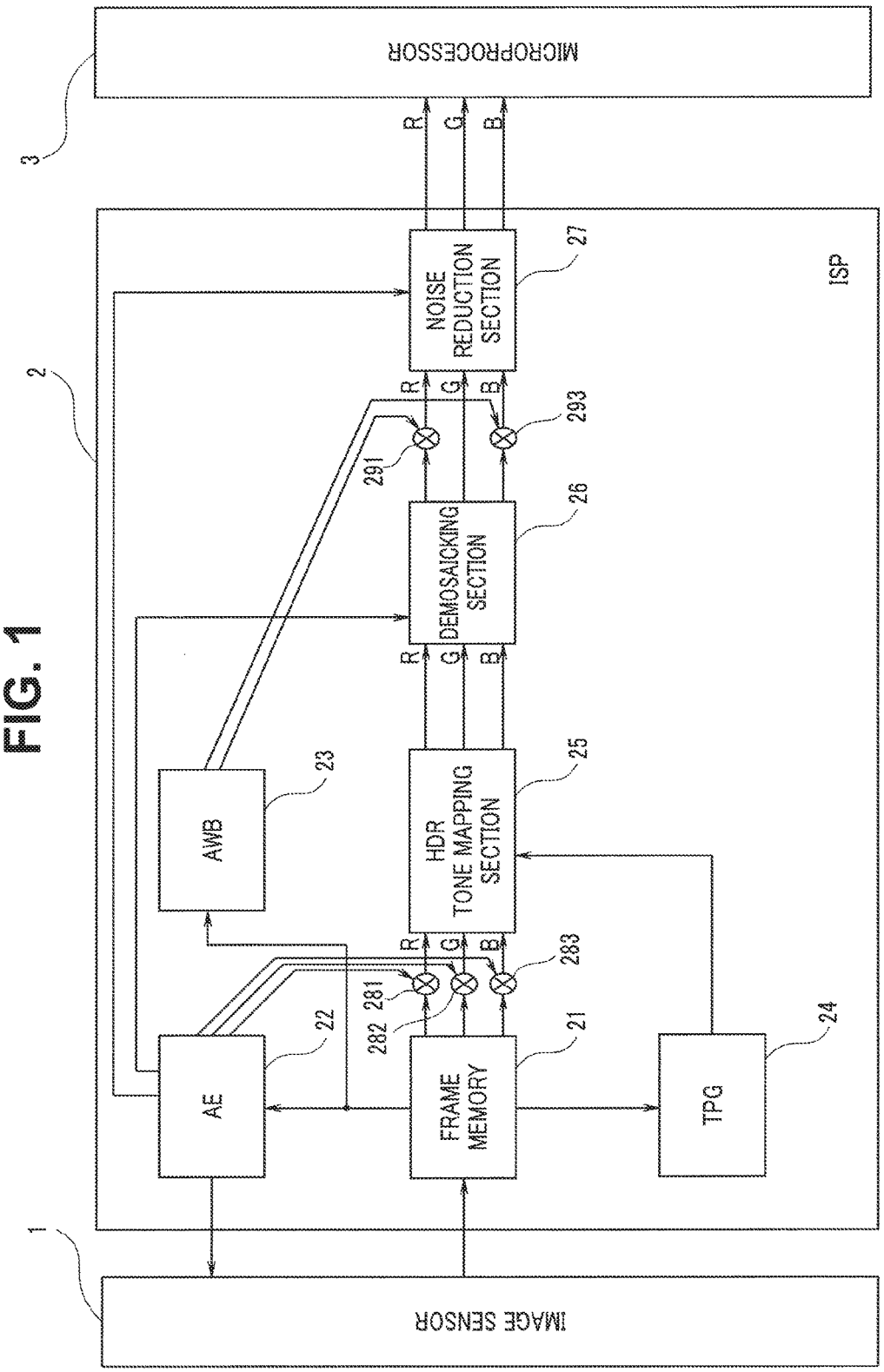
FIG. 1 is a schematic diagram describing an example of an image signal processor apparatus according to an embodiment.

FIG. 1 is a schematic diagram describing an example of an image signal processor apparatus according to an embodiment. An ISP 2 applies various kinds of image processing to RAW data inputted from an image sensor 1, generates an optimum image and outputs the image to a microprocessor 3.

The ISP 2 is mainly constructed of a frame memory 21, an automatic exposure control section (hereinafter referred to as "AE") 22, an automatic white balance control section (hereinafter referred to as "AWB") 23, a tone parameter generation section (hereinafter referred to as "TPG") 24, an HDR tone mapping section 25, a demosaicking section 26, a noise reduction section 27, exposure adjusting multipliers 281, 282 and 283, and white balance adjusting multipliers 291 and 293.

The frame memory 21 is a memory configured to temporarily store at least one frame of image data (RAW data) inputted from the image sensor 1. The stored image data is outputted to the respective circuits of the AE 22, the AWB 23 and the TPG 24. Note that when outputting of image data to the AE 22 and the AWB 23 is completed, the stored 1-frame image data is outputted to the HDR tone mapping section 25 via the exposure adjusting multipliers 281, 282 and 283.

The AE 22 controls an exposure time of the image sensor 1 and brightness of an entire screen using the image data (RAW data) inputted from the frame memory 21. The AE 22 calculates an average of luminance values of all pixels included in the 1-frame image data. When the average value is smaller than a preset reference value, the following control is performed so that the luminance values increase. First, a control signal (exposure time control signal) is outputted to the image sensor 1 so as to extend the exposure time period. Second, a control signal (AE gain control signal) is outputted to the exposure adjusting multipliers 281, 282 and 283 so as to increase a coefficient (AE gain) by which the image data inputted from the frame memory 21 is multiplied.

Furthermore, when the average value is smaller than the preset reference value, the AE 22 determines that the image sensor 1 is picking up an image of a dark scene. The AE 22 outputs a control signal to the demosaicking section 26 so as to decrease intensity of edge enhancement in demosaicking processing. The AE 22 outputs a control signal to the noise reduction section 27 so as to decrease a noise reduction amount.

The exposure adjusting multipliers 281, 282 and 283 multiply RAW data outputted from the frame memory 21 by an AE gain to adjust brightness. The multiplier 281 is used for exposure adjustment of R (red) pixel data, the multiplier 282 is used for exposure adjustment of G (green) pixel data and the multiplier 283 is used for exposure adjustment of B (blue) pixel data. The AE gain values used in the respective multipliers are adjusted by control signals inputted from the AE 22.

The AWB 23 calculates statistical information on the respective color pixels of R (red), G (green) and B (blue) using the image data (RAW data) inputted from the frame memory 21. The AWB 23 estimates a light source that illuminates an image pickup object based on the statistical information. The AWB 23 adjusts pixel values of the color pixels of R (red) and B (blue) based on the estimation result to match those levels to the level of the G (green) pixel and controls white balance so that the color of a white object is also expressed in white color in the image. That is, the AWB 23 outputs control signals to the white balance adjusting multipliers 291 and 293 for indicating coefficients (WB gains) by which the image data inputted from the demosaicking section 26 is multiplied.

The TPG 24 calculates an average of luminance values for every plurality of regions (divided regions) formed by dividing one screen using the pixel data inputted from the frame memory 21. For example, when one screen is divided into 32 portions in vertical and horizontal directions respectively, the TPG 24 calculates an average of luminance values of pixels included in the divided regions for 32×32=1024 divided regions. The average of luminance values of the respective divided regions is outputted to the HDR tone mapping section 25.

The HDR tone mapping section 25 adjusts luminance for each divided region and adjusts contrast to make the entire screen easy to see. For example, in a divided region where the average of luminance values inputted from the TPG 24 is greater than a predetermined reference value, the luminance values of pixels included in the divided region are decreased. On the other hand, in a divided region where the average of luminance values inputted from the TPG 24 is smaller than a predetermined reference value, the luminance values of pixels included in the divided region are increased. Thus, by reducing a contrast ratio (dynamic range) between a brightest portion and a darkest portion of the screen, it is possible to generate images without halation or black crush.

The demosaicking section 26 interpolates and creates missing color information of each pixel using surrounding pixel values (color interpolation processing). When images are picked up by an image sensor using a monochromatic color filter with a Bayer array or the like, each pixel in RAW data has only information on any one of R (red), G (green) and B (blue). For this reason, values of surrounding G (green) pixels are used for pixels having only information on R (red), such pixels are created by interpolating the values of G (green) at the pixel positions and values of peripheral B (blue) pixels are used and such pixels are created by interpolating the values of B (blue) at the pixel positions. Similarly, pixels having only information on G (green) are created by interpolating values of R (red) and values of B (blue) at the pixel positions using information on adjacent pixels and pixels having only information on B (blue) are created by interpolating values of R (red) and values of G (green) of the pixel positions using information on adjacent pixels.

The demosaicking section 26 also performs processing of enhancing edges of an image by making the concentration gradient of contour portions of the image abrupt in color interpolation processing. The degree of edge enhancement can be changed by a control signal inputted from the AE 22 (AE interlocking function). Note that it is also possible to control the degree of edge enhancement by only the demosaicking section 26 without using the AE interlocking function.

The white balance adjusting multipliers 291 and 293 adjust white balance by multiplying the pixel data outputted from the demosaicking section 26 by a WB gain. The multiplier 291 is used for white balance adjustment regarding R (red) pixel data and the multiplier 293 is used for white balance adjustment regarding B (blue) pixel data. The WB gain values used in the respective multipliers are adjusted by control signals inputted from the AWB 23.

The noise reduction section 27 calculates a high-frequency component of the image after the white balance adjustment and removes the high frequency at a certain rate. The rate of removal of the high-frequency component can be changed by a control signal inputted from the AE 22 (AE interlocking function). Note that it is also possible to control the rate of removal by only the noise reduction section 27 without using the AE interlocking function.

Figure 2:
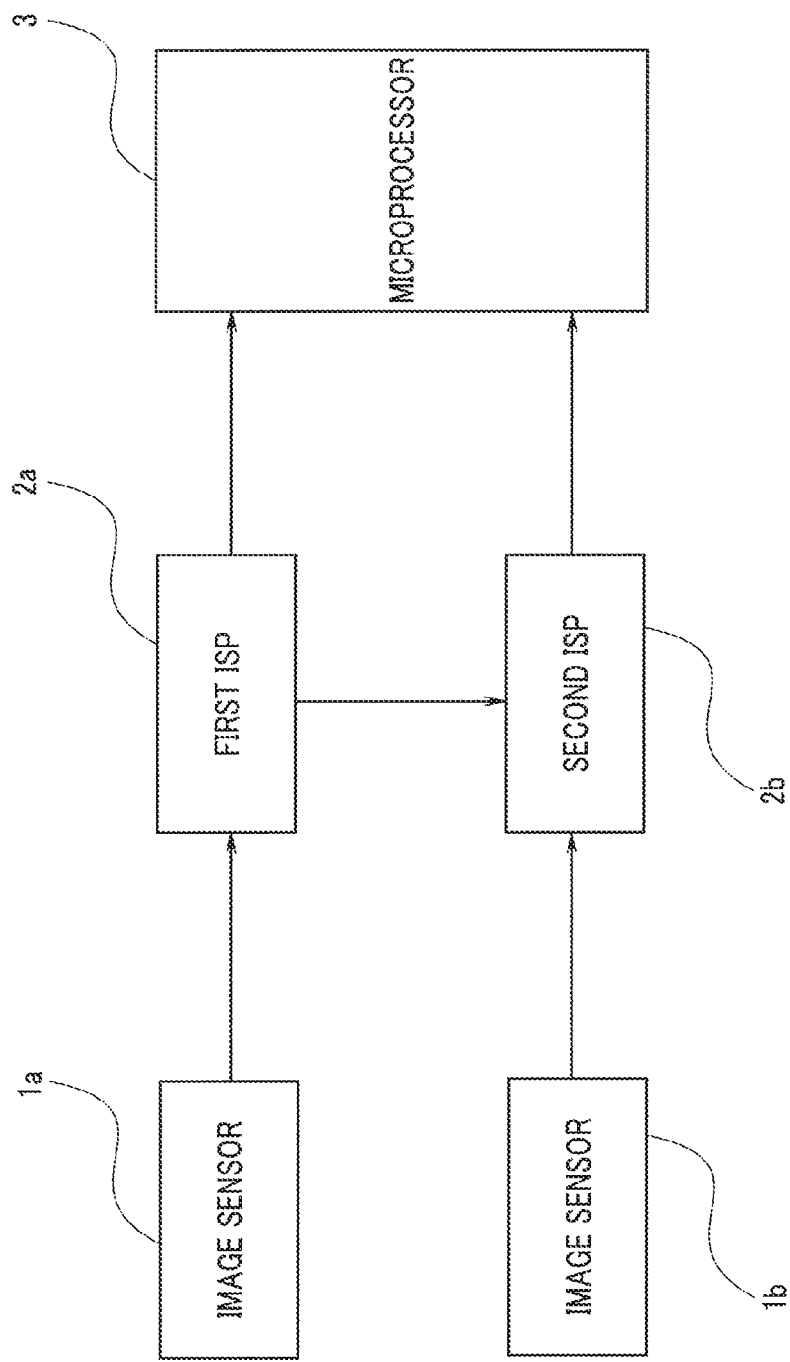
FIG. 2 is a schematic diagram describing an example of a system using two image signal processor apparatuses.

FIG. 2 is a schematic diagram describing an example of a system using two image signal processor apparatuses. The system shown in FIG. 2 is used for image processing of, for example, a stereo camera.

Image data whose image is picked up by an image sensor 1a is subjected to image processing at a first ISP 2a and inputted to the microprocessor 3. On the other hand, image data whose image is picked up by an image sensor 1b is subjected to image processing at a second ISP 2b and inputted to the microprocessor 3. The microprocessor 3 recognizes images of an identical object of the image data (left and right parallax images) inputted from the first ISP 2a and the second ISP 2b and calculates a difference (parallax) in positions of the object in both images.

FIG. 2 shows a configuration assuming the first ISP 2a as a master ISP and the second ISP 2b as a slave ISP. Various control parameters determined by the first ISP 2a are inputted to the second ISP 2b. The second ISP 2b performs various kinds of image processing using any one of a control parameter determined based on image data inputted from the image sensor 1b and a control parameter inputted from the first ISP 2a. For example, it is possible to adjust the values of the AE gains used in the exposure adjusting multipliers 281, 282 and 283 of the second ISP 2b in AE control of the second ISP 2b using a control parameter determined by the AE 22 of the first ISP 2a.

Figure 3:
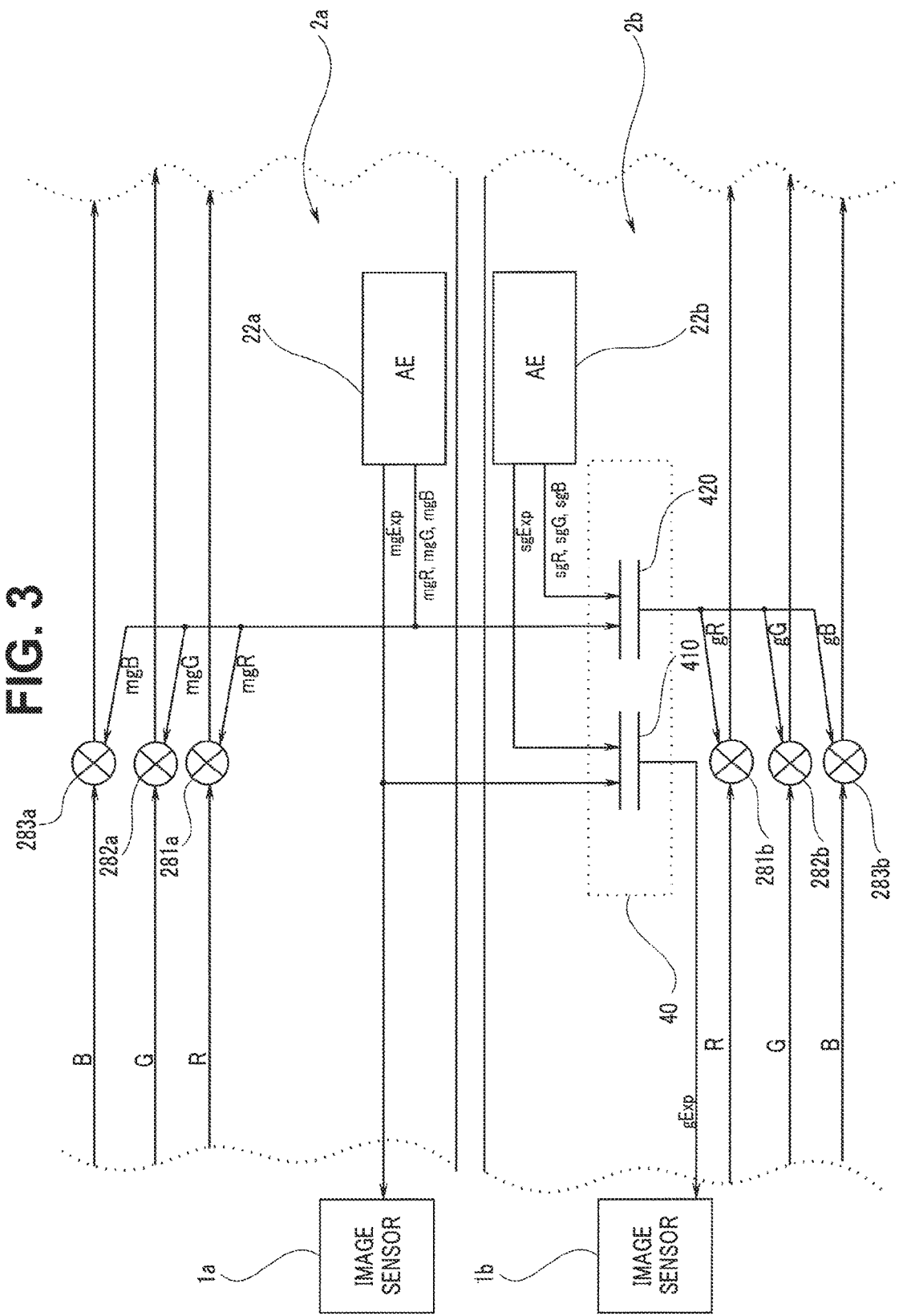
FIG. 3 is a schematic diagram describing an example of a unit that performs AE control according to a first embodiment.

FIG. 3 is a schematic diagram describing an example of a unit that performs AE control according to the first embodiment. The unit that performs AE control in the first ISP 2a is constructed of an AE 22a and exposure adjusting multipliers 281a, 282a and 283a. The AE 22a calculates an average of luminance values of 1-frame pixels using the image data (RAW data) whose image is picked up by the image sensor 1a. The AE 22a generates AE gain control signals mgR, mgG and mgB that control gain values by which color pixel data of R, G and B is multiplied and exposure time period control signal mgExp based on the average of luminance values.

The AE gain control signal mgR is outputted to the R (red) pixel data exposure adjusting multiplier 281a. The AE gain control signal mgG is outputted to the G (green) pixel data exposure adjusting multiplier 282a. The AE gain control signal mgB is outputted to the B (blue) pixel data exposure adjusting multiplier 283a. Furthermore, the AE gain control signals mgR, mgG and mgB are outputted to the second ISP 2b. The exposure time period control signal mgExp is outputted to the image sensor 1a and the second ISP 2b.

The exposure adjusting multipliers 281a, 282a and 283a adjust brightness by multiplying the image data (RAW data) whose image is picked up by the image sensor 1a by an AE gain. The R (red) pixel data exposure adjusting multiplier 281a uses an AE gain adjusted based on the AE gain control signal mgR inputted from the AE 22a. The G (green) pixel data exposure adjusting multiplier 282a uses an AE gain adjusted based on the AE gain control signal mgG inputted from the AE 22a. The B (blue) pixel data exposure adjusting multiplier 283a uses an AE gain adjusted based on the AE gain control signal mgB inputted from the AE 22a.

Note that the image sensor 1a adjusts an exposure time period based on the exposure time period control signal mgExp inputted from the AE 22a.

On the other hand, the unit that performs AE control in the second ISP 2b is constructed of an AE 22b, exposure adjusting multipliers 281b, 282b and 283b, and an AE control signal interlocking determining section 40. The AE 22b calculates an average of luminance values of 1-frame pixels using image data (RAW data) whose image is picked up by the image sensor 1b. The AE 22b generates AE gain control signals sgR, sgG and sgB for controlling gain values by which each color pixel data of R, G and B is multiplied and an exposure time period control signal sgExp based on the average of the luminance values. The AE gain control signals sgR, sgG and sgB are outputted to a gain determining section 420 of the AE control signal interlocking determining section 40. The exposure time period control signal mgExp is outputted to an exposure time period determining section 410 of the AE control signal interlocking determining section 40.

The AE control signal interlocking determining section 40 as a first control signal determining section determines which of the control parameter determined by the first ISP 2a or the control parameter determined by the second ISP 2b is used regarding AE-related control in the image sensor 1b and the second ISP 2b. The AE control signal interlocking determining section 40 is constructed of the gain determining section 420 and the exposure time period determining section 410.

The gain determining section 420 calculates a difference (DiffG) between the AE gain control signals mgR, mgG and mgB inputted from the AE 22a and the AE gain control signals sgR, sgG, sgB inputted from the AE 22b and compares the difference with a preset gain interlocking threshold TH1. To be more specific, DiffG is calculated using Equation (1) shown below.

$$\text{DiffG} = abs(mgR - sgR) + abs(mgG - sgG) + abs(mgB - sgB) \quad \text{Equation (1)}$$

The exposure time period determining section 410 calculates a difference (DiffE) between the exposure time period control signal mgExp inputted from the AE 22a and the exposure time period control signal sgExp inputted from the AE 22b and compares the difference with a preset exposure time period interlocking threshold TH2. To be more specific, DiffE is calculated using Equation (2) shown below.

$$\text{DiffE} = abs(mgExp - sgExp) \quad \text{Equation (2)}$$

When DiffG≤TH1 and DiffE≤TH2, AE gain control on the second ISP 2b side and control on the exposure time period of the image sensor 1b are performed using control parameters determined by the first ISP 2a. That is, the gain determining section 420 selects the AE gain control signal mgR as an AE gain control signal gR to be inputted to the R (red) pixel data exposure adjusting multiplier 281b, selects the AE gain control signal mgG as an AE gain control signal gG to be inputted to the G (green) pixel data exposure adjusting multiplier 282b and selects an AE gain control signal mgB as an AE gain control signal gB to be inputted to the B (blue) pixel data exposure adjusting multiplier 283b. The exposure time period determining section 410 selects the exposure time period control signal mgExp as an exposure time period control signal gExp to be inputted to the image sensor 1b.

On the other hand, when DiffG>TH1 or DiffE>TH2, AE gain control on the second ISP 2b side and control on the exposure time period of the image sensor 1b are performed using control parameters determined by the second ISP 2b. That is, the gain determining section 420 selects the AE gain control signal sgR as the AE gain control signal gR to be inputted to the R (red) pixel data exposure adjusting multiplier 281b, selects the AE gain control signal sgG as the AE gain control signal gG to be inputted to the G (green) pixel data exposure adjusting multipliers 282b and selects the AE gain control signal sgB as the AE gain control signal gB to be inputted to the B (blue) pixel data exposure adjusting multiplier 283b. Furthermore, the exposure time period determining section 410 selects the exposure time period control signal sgExp as the exposure time period control signal gExp to be inputted to the image sensor 1b.

Thus, according to the present embodiment, when a difference (DiffG) between the AE gain control signals mgR, mgG and mgB generated by the first ISP 2a and the AE gain control signals sgR, sgG and sgB generated by the second ISP 2b is equal to or less than the gain interlocking threshold TH1 and when a difference (DiffE) between the exposure time period control signal mgExp generated by the first ISP 2a and the exposure time period control signal sgExp generated by the second ISP 2b is equal to or less than the exposure time interlocking threshold TH2, the gain control signals mgR, mgG and mgB generated by the first ISP 2a and the exposure time period control signal mgExp are used for AE control of the second ISP 2b. That is, when luminance of an image picked up by the image sensor 1a is substantially equal to luminance of an image picked up by the image sensor 1b, the same control parameter (control signal generated by the first ISP 2a) is used for AE control of the first ISP 2a and the second ISP 2b. Therefore, it is possible to avoid large differences in brightness or color between the image outputted from the first ISP 2a and the image outputted from the second ISP 2b.

Note that when the AE interlocking function is used for the demosaicking section 26 and the noise reduction section 27, a configuration may be adopted in which a control signal outputted from the AE 22a of the first ISP 2a can be used by the demosaicking section 26 and the noise reduction section 27 of the second ISP 2b. In this case, based on the determination result of the AE control signal interlocking determining section 40, it is determined which of a control signal outputted from the AE 22a of the first ISP 2a or a control signal outputted from the AE 22b of the second ISP 2b is used as a control signal used for the demosaicking section 26 or the noise reduction section 27.

When a unit other than the demosaicking section 26 and the noise reduction section 27 that uses the AE interlocking function is present, a configuration may also be adopted for the unit in which either a control signal outputted from the AE 22a of the first ISP 2a or a control signal outputted from the AE 22b of the second ISP 2b is selected and inputted based on the determination result at the AE control signal interlocking determining section 40.

The number of ISPs interlocked is not limited to two, but may be three or more. In the case of three or more ISPs, one is designated as a master ISP and the others are designated as slave ISPs.

According to the present embodiment, a configuration is adopted in which only one ISP (second ISP 2b) out of the two ISPs is provided with the AE control signal interlocking determining section 40 and control parameters generated by the first ISP 2a are always used for AE control of the first ISP 2a (configuration using the first ISP 2a as a master ISP, and the second ISP 2b as a slave ISP), but a configuration may also be adopted in which the first ISP 2a is also provided with the AE control signal interlocking determining section 40 so that the master ISP is switchable.

Figure 4:
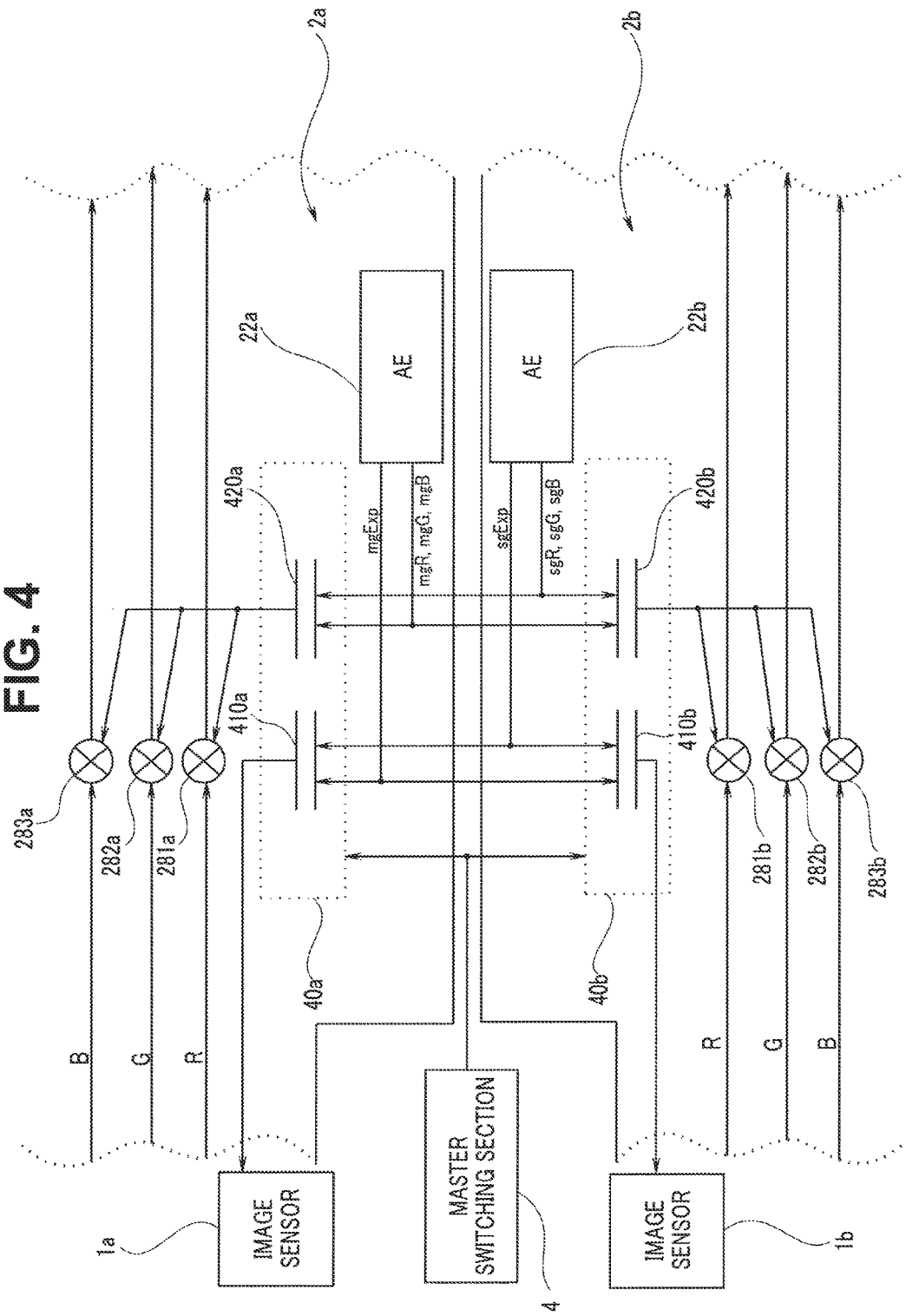
FIG. 4 is a schematic diagram describing another example of the unit that performs AE control according to the first embodiment.

FIG. 4 is a schematic diagram describing another example of the unit that performs AE control according to the first embodiment. As shown in FIG. 4, the first ISP 2a and the second ISP 2b are provided with AE control signal interlocking determining sections 40a and 40b respectively and are provided with a master switching section 4 that selects which ISP should be the master ISP. The master switching section 4 sets which of the first ISP 2a or the second ISP 2b should be the master according to a predetermined program set in advance or an external input instruction by the user or the like. The master switching section 4 outputs a control signal to the AE control signal interlocking determining section 40 of the ISP 2 set as the master so as to set the determination function to "OFF." The AE control signal interlocking determining section 40 whose determination function is set to "OFF" outputs an AE gain control signal and an exposure time period control signal inputted from the AE 22 which is located in the same unit to the exposure adjusting multipliers 281, 282 and 283, and the image sensor 1 as they are. The master switching section 4 outputs a control signal to the AE control signal interlocking determining section 40 of the ISP 2 which is set as the slave so as to set its determination function to "ON." As described above, when both a difference between the AE gain control signals generated by the master ISP and the slave ISP and a difference between exposure time period control signals generated by the master ISP and the slave ISP are determined to be smaller than a set threshold, the AE control signal interlocking determining section 40 whose determination function is set to "ON" outputs the AE gain control signal and the exposure time period control signal inputted from the master ISP, and otherwise outputs the AE gain control signal and the exposure time period control signal on the slave side.

For example, when the second ISP 2b is set as the master, the master switching section 4 outputs a control signal to the AE control signal interlocking determining section 40b of the second ISP 2b so as to set its determination function to "OFF." The AE control signal interlocking determining section 40b outputs the AE gain control signals sgR, sgG and sgB inputted from the AE 22b which is located in the same unit to the exposure adjusting multipliers 281b, 282b and 283b, and outputs the exposure time period control signal sgExp to the image sensor 1b.

The master switching section 4 outputs a control signal to the AE control signal interlocking determining section 40a of the first ISP 2a which is on the slave side so as to set the determination function to "ON." When a difference between AE gain control signals generated by the second ISP 2b which is on the master side and the first ISP 2a which is on the slave side is determined to be equal to or lower than the gain interlocking threshold TH1 and a difference between exposure time period control signals generated by the second ISP 2b and the first ISP 2a is determined to be equal to or lower than the exposure time period interlocking threshold TH2, the AE control signal interlocking determining section 40a outputs the AE gain control signals sgR, sgG and sgB, and the exposure time period control signal sgExp inputted from the second ISP 2b which is on the master side, and otherwise outputs the AE gain control signals mgR, mgG and mgB, and the exposure time period control signal mgExp inputted from the AE 22a of the first ISP 2a which is on the slave side.

Thus, by arranging the AE control signal interlocking determining sections 40 in all the ISPs 2 and providing the master switching section 4 in which the master ISP is set, it is possible to not only use common parameters among all the ISPs but also perform AE control using optimum parameters.

(Second Embodiment)

In the system using the image signal processor apparatus according to the first embodiment, two ISPs are interlocked and parameters relevant to AE control are shared commonly when a predetermined condition is satisfied. In contrast, a second embodiment is different in that parameters relevant to AWB control are shared commonly. An overall configuration of an image signal processor apparatus according to the second embodiment and a configuration of a system using two image signal processor apparatuses are similar to those of the first embodiment. Hereinafter, a detailed configuration of a unit that performs AWB control and an interlocking method will be described.

Figure 5:
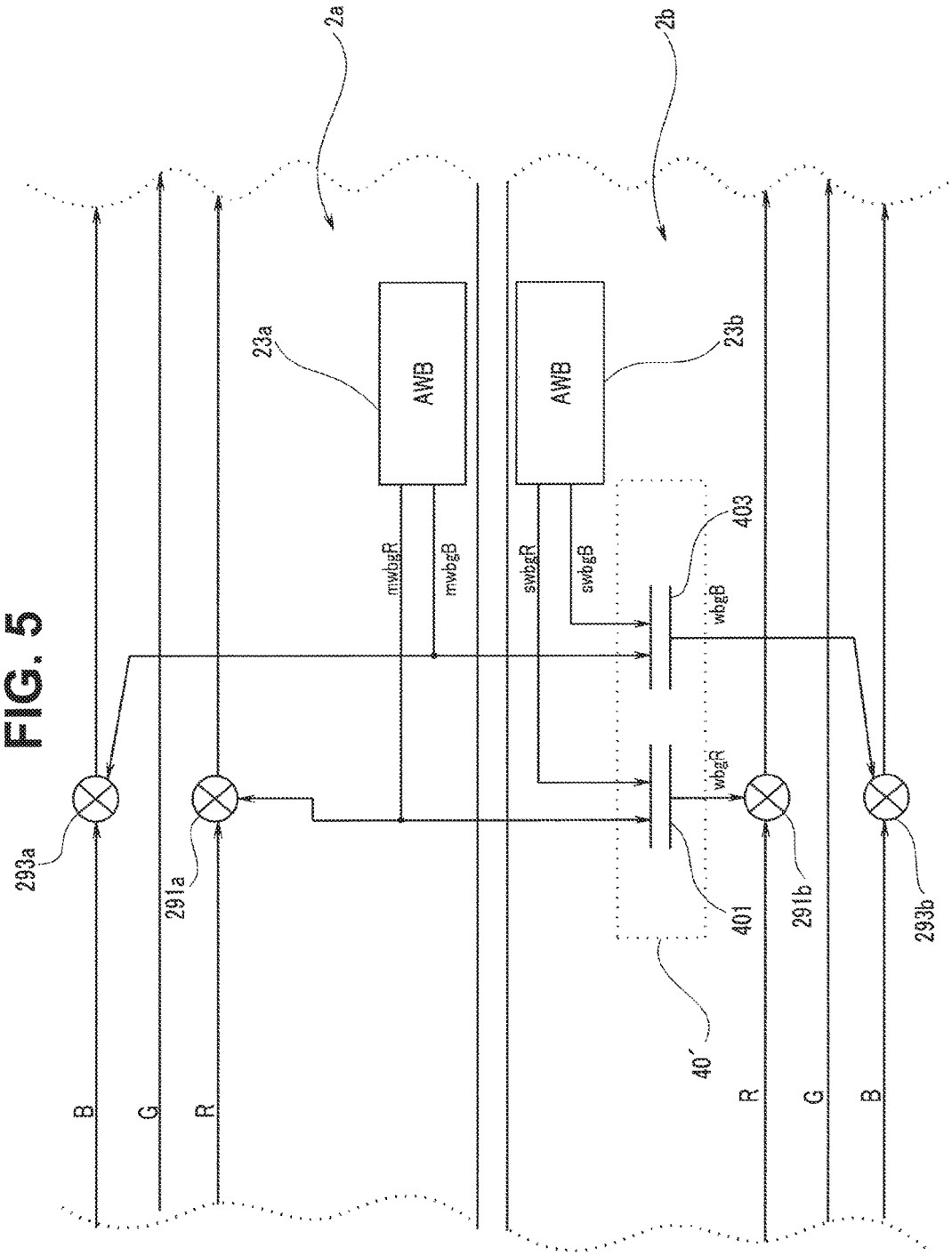
FIG. 5 is a schematic diagram describing an example of a unit that performs white balance control according to a second embodiment.

FIG. 5 is a schematic diagram describing an example of a unit that performs white balance control according to the second embodiment. Components similar to those of the first embodiment are assigned the same reference numerals and description of the components will be omitted. The unit that performs AWB control in the first ISP 2a is constructed of an AWB 23a and white balance adjusting multipliers 291a and 293a. The AWB 23a calculates statistical information on respective color pixels of R (red), G (green) and B (blue) using image data (RAW data) whose image is picked up by the image sensor 1a. A light source illuminating the image pickup object is estimated based on the statistical information. WB gain control signals mwbgR and mwbgB that control gain values by which color pixel data of R (red) and B (blue) are multiplied are generated based on the estimated result.

The WB gain control signal mwbgR is outputted to the R (red) pixel data white balance adjusting multiplier 291a. The WB gain control signal mwbgB is outputted to the B (blue) pixel data white balance adjusting multiplier 293a. Furthermore, the WB gain control signals mwbgR and mwbgB are outputted to the second ISP 2b.

The white balance adjusting multipliers 291a and 293a multiply the pixel data outputted from the demosaicking section 26 by a WB gain to adjust white balance. The R (red) pixel data white balance adjusting multiplier 291a uses the WB gain adjusted based on the WB gain control signal mwbgR inputted from the AWB 23a. The B (blue) pixel data white balance adjusting multiplier 293 uses the WB gain adjusted based on the WB gain control signal mwbgB inputted from the AWB 23a.

On the other hand, the unit that performs AWB control in the second ISP 2b is constructed of an AWB 23b, white balance adjusting multipliers 291b and 293b, and an AWB control signal interlocking determining section 40'. The AWB 23b calculates statistical information on respective color pixels of R (red), G (green) and B (blue) using image data (RAW data) whose image is picked up by the image sensor 1b. The AWB 23b estimates a light source illuminating an image pickup object based on the statistical information. The AWB 23b generates WB gain control signals swbgR and swbgB for controlling gain values by which R (red) and B (blue) color pixel data is multiplied based on the estimation result. The WB gain control signal swbgR is outputted to the R gain determining section 401 of the AWB control signal interlocking determining section 40'. The WB gain control signal swbgB is outputted to the B gain determining section 403 of the AWB control signal interlocking determining section 40'.

The AWB control signal interlocking determining section 40' determines which of the control parameter determined by the first ISP 2a or the control parameter determined by the second ISP 2b is used for AWB-related control in the second ISP 2b. The AWB control signal interlocking determining section 40' is constructed of an R gain determining section 401 and a B gain determining section 403.

The R gain determining section 401 calculates a difference between the WB gain control signal mwbgR inputted from the AWB 23a and the WB gain control signal swbgR inputted from the AWB 23b. The B gain determining section 403 calculates a difference between the WB gain control signal mwbgB inputted from the AWB 23a and the WB gain control signal swbgB inputted from the AWB 23b. The AWB control signal interlocking determining section 40' calculates the sum of the differences calculated from the R gain determining section 401 and the B gain determining section 403 (DiffG') and compares the sum with a gain interlocking threshold TH3 set in advance. To be more specific, DiffG' is calculated using Equation (3) shown below.

$$\text{DiffG}'=\text{abs}(\text{mwbgR}-\text{swbgR})+\text{abs}(\text{mwbgB}-\text{swbgB}) \quad \text{Equation (3)}$$

When DiffG'≤TH3, AWB control on the second ISP 2b side is performed using control parameters determined by the first ISP 2a. That is, the R gain determining section 401 selects the WB gain control signal mwbgR as the WB gain control signal wbgR to be inputted to the R (red) pixel data white balance adjusting multiplier 291b. The B gain determining section 403 selects the WB gain control signal mwbgB as the WB gain control signal wbgB to be inputted to the B (blue) pixel data white balance adjusting multiplier 293b.

On the other hand, when DiffG'>TH3, AWB control on the second ISP 2b side is performed using a control parameter determined by the second ISP 2b. That is, the R gain determining section 401 selects the WB gain control signal swbgR as the WB gain control signal wbgR to be inputted to the R (red) pixel data white balance adjusting multiplier 291b. Furthermore, the B gain determining section 403 selects the WB gain control signal swbgB as the WB gain control signal wbgB to be inputted to the B (blue) pixel data white balance adjusting multiplier 293b.

Thus, according to the present embodiment, when a difference (DiffG') between the AWB gain control signals mwbgR and mwbgB generated by the first ISP 2a, and the AWB gain control signals swbgR and swbgB generated by the second ISP 2b is equal to or less than the gain interlocking threshold TH3, the AWB gain control signals mwbgR and mwbgB generated by the first ISP 2a are used for AWB control of the second ISP 2b. That is, when the luminance or color difference is substantially equal between the image picked up by the image sensor 1a and the image picked up by the image sensor 1b, the same control parameter (control signal generated by the first ISP 2a) is used for AWB control of the first ISP 2a and the second ISP 2b. Therefore, it is possible to prevent a large difference in brightness or colors from being generated between the image outputted from the first ISP 2a and the image outputted from the second ISP 2b.

Note that for the gain interlocking threshold TH3, a preset fixed value may be used or the gain interlocking threshold TH3 may be changed according to the value of the AE gain control signal outputted from the AE 22 as appropriate. Alternatively, a correction coefficient for absorbing characteristic differences corresponding to individual differences between the image sensor 1a and the image sensor 1b may be set in the multipliers 291a and 293a on the second ISP 2b side and the product of the WB gain control signal inputted from the AWB control signal interlocking determining section 40' and the correction coefficient may be designated as a WB gain.

Furthermore, the number of ISPs to be interlocked is not limited to two, but may be three or more. In the case of three or more ISPs, one is designated as a master ISP and the others are designated as slave ISPs.

The second ISP 2b may be configured to include a unit for interlocking AE control shown in the first embodiment in addition to the unit for interlocking AWB control. In this case, a determination as to whether or not to interlock AWB control and a determination as to whether or not to interlock AE control are made independently of each other.

Furthermore, the present embodiment adopts a configuration in which only one of the two ISPs (second ISP 2b) is provided with the AWB control signal interlocking determining section 40' and AWB control of the first ISP 2a is always performed using a control parameter generated by the first ISP 2a (configuration in which the first ISP 2a is used as a master ISP and the second ISP 2b is used as a slave ISP), but a configuration may be adopted in which the first ISP 2a is also provided with the AWB control signal interlocking determining section 40' and the master ISP is switchable.

Figure 6:
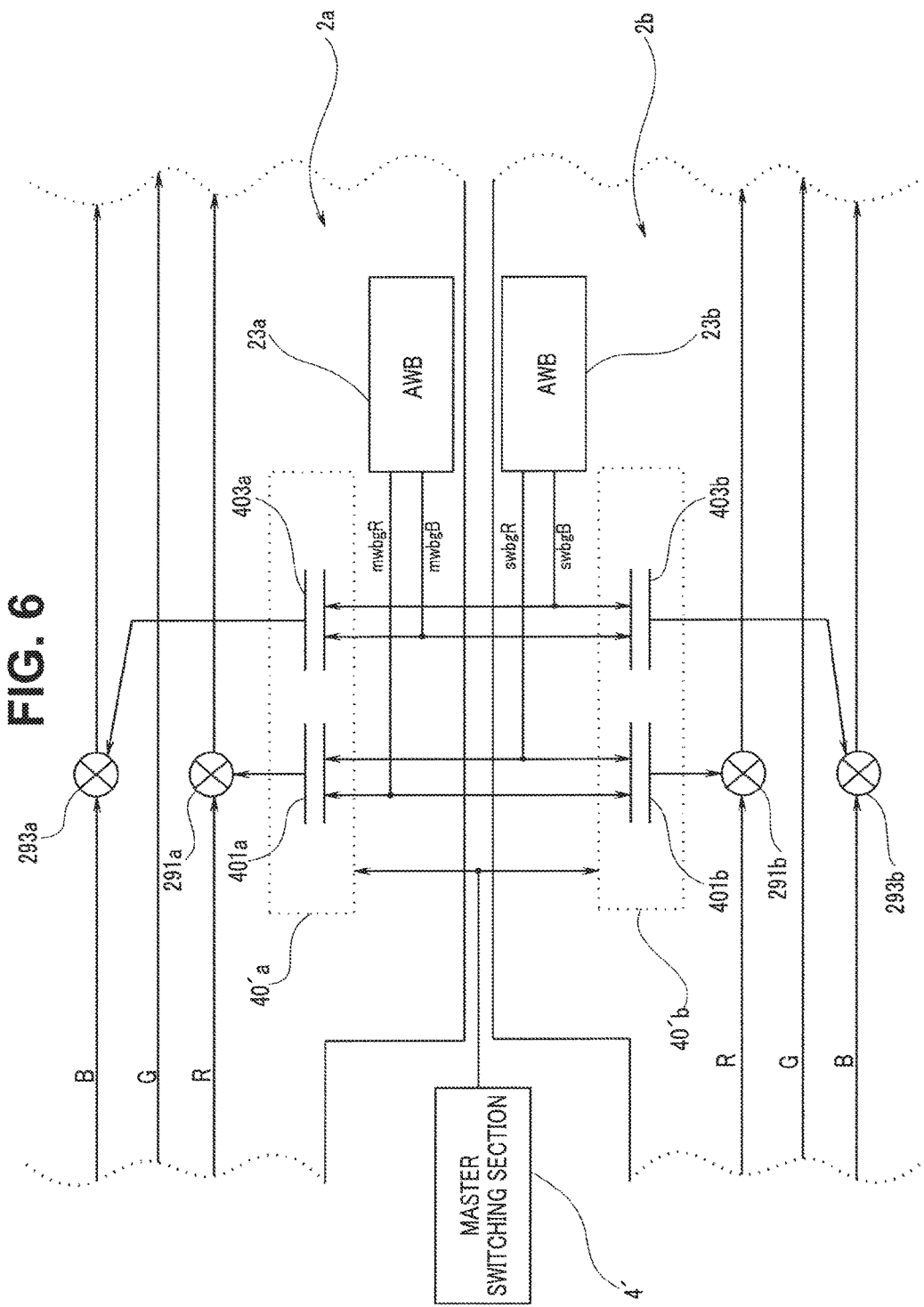
FIG. 6 is a schematic diagram describing another example of the unit that performs white balance control according to the second embodiment.

FIG. 6 is a schematic diagram describing another example of the unit that performs white balance control according to the second embodiment. As shown in FIG. 6, the first ISP 2a and the second ISP 2b are provided with AWB control signal interlocking determining sections 40'a and 40'b respectively and are also provided with a master switching section 4' configured to select which ISP should be the master ISP. The master switching section 4' sets which of the first ISP 2a or the second ISP 2b should be selected as the master according to a predetermined program set in advance or an external input instruction by the user or the like. The master switching section 4' outputs a control signal to the AWB control signal interlocking determining section 40' of the ISP 2 set as the master so as to set the determination function to "OFF." The AWB control signal interlocking determining section 40' whose determination function is set to "OFF" outputs an AWB gain control signal inputted from the AWB 23 located in the same unit to the white balance adjusting multipliers 291 and 293 as they are. The master switching section 4' outputs a control signal to the AWB control signal interlocking determining section 40' of the ISP 2 which is set as the slave so as to set its determination function to "ON." As described above, when a difference between the AWB gain control signals generated by the master ISP and the slave ISP is determined to be smaller than the set threshold TH3, the AWB control signal interlocking determining section 40' whose determination function is set to "ON" outputs the AWB gain control signal inputted from the master ISP, and otherwise outputs the AWB gain control signal on the slave side.

For example, when the second ISP 2b is set as the master, the master switching section 4' outputs a control signal to the AWB control signal interlocking determining section 40'b of the second ISP 2b so as to set the determination function to "OFF." The AWB control signal interlocking determining section 40'b outputs the AWB gain control signals swbgR and swbgB inputted from the AWB 23b located in the same unit to the white balance adjusting multipliers 291b and 293b.

The master switching section 4 outputs a control signal to the AWB control signal interlocking determining section 40'a of the first ISP 2a which is on the slave side so as to set the determination function to "ON." When a difference between AWB gain control signals generated by the second ISP 2b which is on the master side and the first ISP 2a which is on the slave side is determined to be equal to or lower than the gain interlocking threshold TH3, the AWB control signal interlocking determining section 40'a outputs the AWB gain control signals swbgR and swbgB inputted from the second ISP 2b which is on the master side, and otherwise outputs the AWB gain control signals mwbgR and mwbgB inputted from the AWB 23a of the first ISP 2a which is on the slave side.

Thus, by arranging the AWB control signal interlocking determining sections 40' in all the ISPs 2 and providing the master switching section 4' in which the master ISP is set, it is possible to not only use common parameters among all the ISPs but also perform AWB control using optimum parameters.

As described above, according to the present embodiment, it is possible to prevent, when a picked up image of the same object is processed by a plurality of IPSs, a large difference in brightness and colors from being produced among the processed images.

Each "section" such as a module in the present Specification is a conceptual term corresponding to each function of each embodiment and does not necessarily have a one-to-one correspondence with a specific hardware or software routine. Therefore, the present Specification has described the embodiments assuming a virtual circuit block (section) which has each function of each embodiment.

While certain embodiments have been described, these embodiments have been presented by way of example only, and are not intended to limit the scope of the inventions. Indeed, the novel devices described herein may be embodied in a variety of other forms; furthermore, various omissions, substitutions and changes in the form of the devices described herein may be made without departing from the spirit of the inventions. The accompanying claims and their equivalents are intended to cover such forms or modifications as would fall within the scope and spirit of the inventions.

What is claimed is:

1. An image signal processor apparatus comprising:
a first image signal processor apparatus configured to receive first image data as input; and
a second image signal processor apparatus configured to receive second image data as input,
wherein the second image signal processor apparatus selects, as a signal to adjust pixel values of the second image data, one of a first signal that the first image signal processor apparatus uses for first image processing to adjust pixel values of the first image data and a second signal generated based on the second image data, and when selecting the first signal, uses the first signal to perform the first image processing of adjusting pixel values of the second image data.

2. The image signal processor apparatus according to claim 1, wherein the second image signal processor selects, when a difference between the first signal and the second signal is equal to or lower than a first threshold, the first signal as a signal to adjust pixel values of the second image data.

3. The image signal processor apparatus according to claim 2, wherein the first threshold is changeable.

4. The image signal processor apparatus according to claim 1, wherein the second image signal processor selects, when a difference between the first signal and the second signal is greater than a first threshold, the second signal as a signal to adjust pixel values of the second image data.

5. The image signal processor apparatus according to claim 4, wherein the first threshold is changed based on statistical information on second image processing whereby the first image signal processor apparatus adjusts pixel values of the first image data.

6. The image signal processor apparatus according to claim 5, wherein the first image processing is white balance control to adjust white balance of the first image data and the second image processing is exposure control to adjust luminance values of the first image data.

7. The image signal processor apparatus according to claim 6, wherein the statistical information is an exposure gain control signal to adjust a gain by which pixel values of the first image data are multiplied.

8. The image signal processor apparatus according to claim 1, wherein the first image processing is exposure control to adjust luminance values of the first image data.

9. The image signal processor apparatus according to claim 8, wherein the first signal is an exposure time period control signal to control an exposure time period of an image sensor that generates the first image data and an exposure gain control signal to adjust a gain by which pixel values of the first image data are multiplied.

10. The image signal processor apparatus according to claim 1, wherein the first image processing is white balance control to adjust white balance of the first image data.

11. An image signal processing method comprising:
generating a first signal to be used in a first image signal processor apparatus configured to receive first image data as input for first image processing to adjust pixel values of the first image data; and
selecting one of the first signal and a second signal generated based on the second image data, as a signal to adjust pixel values of the second image data, in a second image signal processor apparatus configured to receive second image data as input, and when selecting the first signal, using the first signal to perform the first image processing to adjust pixel values of the second image data.

12. The image signal processing method according to claim 11, wherein the second image signal processor selects, when a difference between the first signal and the second signal is equal to or lower than a first threshold, the first signal as the signal to adjust pixel values of the second image data.

13. The image signal processing method according to claim 12, wherein the first threshold is changeable.

14. The image signal processing method according to claim 13, wherein the first threshold is changed based on statistical information on second image processing whereby the first image signal processor apparatus adjusts pixel values of the first image data.

15. The image signal processing method according to claim 11, wherein the first image processing is exposure control to adjust luminance values of the first image data.

16. The image signal processing method according to claim 15, wherein the first signal is an exposure time period control signal to control an exposure time period of an image sensor that generates the first image data and an exposure gain control signal to adjust a gain by which pixel values of the first image data are multiplied.

17. The image signal processing method according to claim 11, wherein, the first image processing is white balance control to adjust white balance of the first image data.

18. The image signal processing method according to claim 15, wherein the first image processing is white balance control to adjust white balance of the first image data and a second image processing is exposure control to adjust luminance values of the first image data.

* * * * *